No. 730,542.

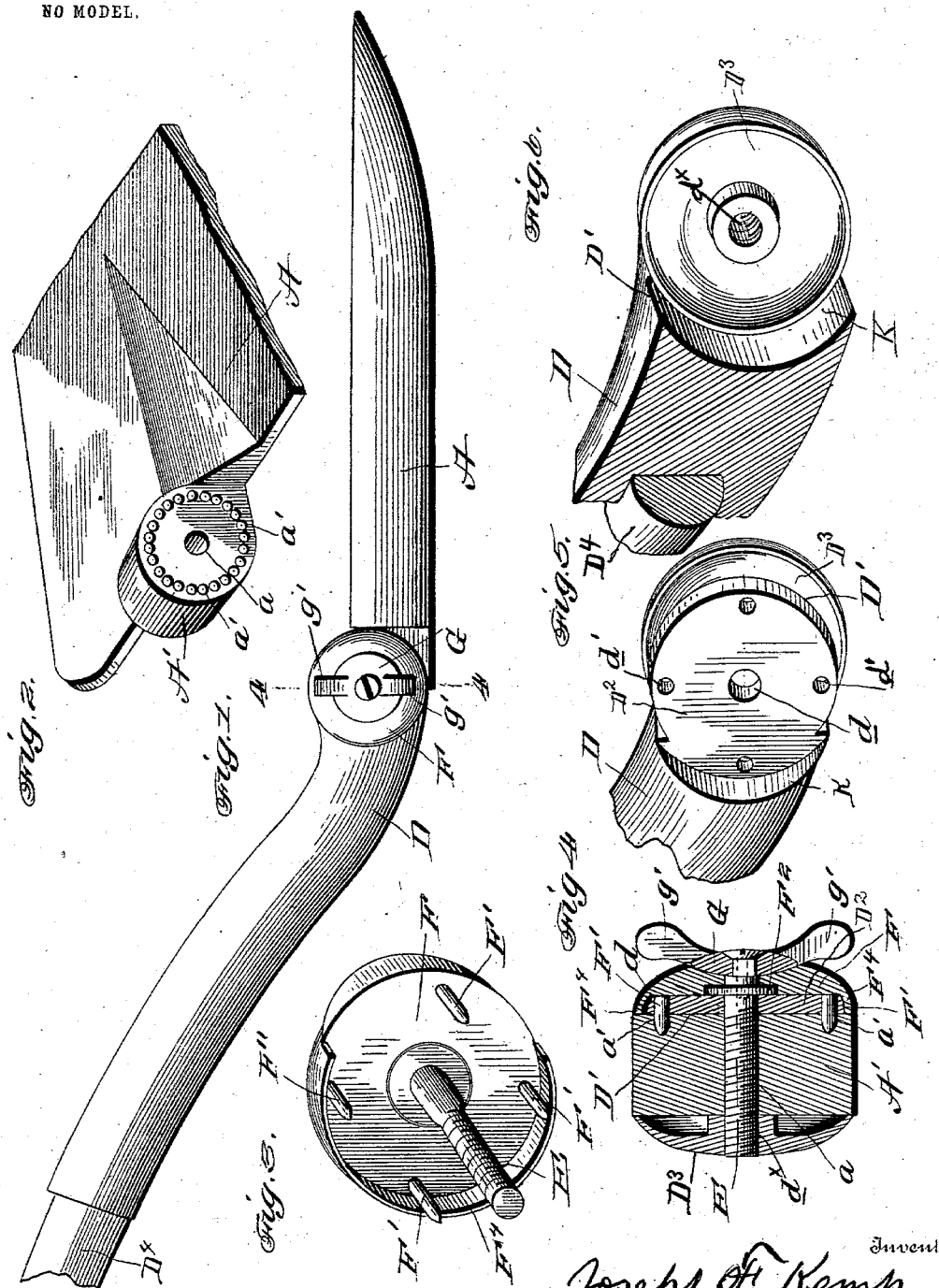

Patented June 9, 1903.

UNITED STATES PATENT OFFICE.

JOSEPH FRANKLIN KEMP, OF ZANESVILLE, OHIO.

MEANS FOR ADJUSTABLY SECURING TOOL-HEADS TO HANDLES.

SPECIFICATION forming part of Letters Patent No. 730,542, dated June 9, 1903.

Application filed November 26, 1902. Serial No. 132,919. (No model.)

*To all whom it may concern:*

Be it known that I, JOSEPH FRANKLIN KEMP, a citizen of the United States, residing at Zanesville, in the county of Muskingum and State of Ohio, have invented certain new and useful Improvements in Means for Adjustably Securing Tool-Heads to Handles; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in means for holding the heads of tools in different positions with reference to the handle to which they are attached; and it consists in the provision of means whereby the head of a tool may be easily and quickly adjusted at any angle to the handle and held in an adjusted position by means of a thumb-screw and clamping means adapted to engage and hold the head of the tool in an adjusted position.

The invention consists, further, in various details of construction and in combinations of parts, which will be hereinafter described and then specifically defined in the appended claims.

My invention is illustrated in the accompanying drawings, which, with the letters of reference marked thereon, form a part of this application, and in which drawings—

Figure 1 is a side elevation showing my invention as applied to a handle and a spade. Fig. 2 is a detailed view of one end of the spade, showing the shank portion thereof, which is held to the handle. Fig. 3 is a detailed view of the clamping-plate, through which an adjusting-screw passes. Fig. 4 is a cross-sectional view on line 4 4 of Fig. 1. Fig. 5 is a perspective view of one end of the handle, which is recessed to receive the shank portion of the spade. Fig. 6 is a vertical longitudinal section through the end of the handle.

Reference now being had to the details of the drawings by letter, A designates a spade, it being understood that it is my purpose to employ my invention as applied to any kind of tools; but in the present instance I have illustrated same for adjustably holding a spade to a handle. Said spade has a shank portion A', which is cylindrically outlined and has a central aperture $a$ and a circular series of indentations $a'$ in one face thereof and about said central aperture. One end of the handle D, to which an inner handle $D^4$ is fitted, is bifurcated, forming the parts $D^2$ and $D^3$, having a recess D' between said parts designed to receive said cylindrical-shaped shank portion of the spade, and said parts $D^3$ and $D^2$ are centrally apertured, as at $d$ and $d^\times$, respectively, the wall of one of the apertures, as $d^\times$, being threaded to receive the threaded end of the screw E.

A clamping-plate F is provided which is centrally apertured and has a series of lugs F' projecting from one face thereof, said lugs being adapted when the plate is adjusted in place upon the handle to enter the apertures $d'$ in one wall of the recessed end of the handle and to engage in the indentations $a'$ in the face of the shank portion of the spade, whereby the spade may be held in an adjusted position with relation to the handle. Said screw has swivel connection with the plate F by passing through a central aperture therein and having a disk $F^2$ in a recess in one side of the plate, while a head G, having wings $g'$ thereon, is fastened to the outer end of the screw and is seated in a recess in the outer face thereof, the outer face of said head when adjusted in place being flush with the outer face of the plate. It will be observed that the outer face of one of the walls of said recess in the handle is cut away, forming a concave shoulder K. A portion of the circumference of said plate is of a thickness equal to the width of said concave shoulder, so that when the plate is fastened in the cut-away portion of the handle the outer face of the plate and the adjacent surface of the handle will be flush with each other. A portion of the periphery of said plate has a flange $F^4$, which is adapted when the plate is seated in the cut-away portion of the handle to extend over the beveled edge of the wall of the recessed end of the handle, and its edge when thus positioned will be flush with the inner face of the wall of the handle, which has apertures therein to receive said lugs.

From the foregoing it will be observed that by loosening the screw and removing the same from the recessed end of the handle a shank portion of the spade or other tool-head is inserted in said recess, and said shank portion of the tool, which is cylindrical in outline, may be turned upon the inner concave wall of the recessed end of the handle, so that the tool may be disposed in alinement with the handle or at any angle thereto, and by tightening the screw the lugs on the plate will engage in the indentations in the face of the shank portion of the spade and the head of the tool will be securely held in an adjusted position.

From the foregoing it will be observed that by the provision of my adjustable means for holding the head of the tool at different positions with relation to the handle the tool may be made applicable for various uses and may be readily and quickly adjusted by the simple manipulation herein described.

While I have shown the particular construction of the apparatus illustrating my invention, it will be understood that I may make alterations in the details of the adjusting means without departing from the spirit of the invention.

Having thus described my invention, what I claim as new, and desire to secure by Letters Patent, is—

1. Means for holding the head of a tool in an adjusted relation with reference to its handle, comprising a handle having a recessed end, a tool having a shank portion positioned in said recess, a clamping-plate having lugs thereon which are adapted to engage the handle and the shank portion of the head of the tool, and a screw carried by the plate and passing through the walls of the recessed end of the handle and the shank portion of the tool-head, as set forth.

2. Means for securing and adjustably holding the head of a tool in different positions with relation to the handle thereof, comprising a handle having a recessed end with registering apertures therein, a tool-head having a shank portion positioned in said recessed end of the handle and centrally apertured, a clamping-plate, and means carried thereby for engaging and holding the handle and shank portion of the tool-head in an adjusted position, and a swivel-screw carried by said plate and engaging the registering apertures in the handle end and shank portion of the tool, as set forth.

3. An apparatus for holding a tool-head in an adjusted position with relation to the handle therefor, consisting of a handle with a recessed end, the walls of the said recessed portion having central registering apertures, one of the latter being threaded, a tool-head having a shank portion of cylindrical outline, and adapted to be inserted in said recess and to have a partial rotary movement therein, indentations in said shank portion, a plate having a series of projections upon one face thereof adapted to be passed through the inner apertures in one wall of the recessed end of the handle and engage indentations in the shank portion of the tool-head, and a swivel-screw carried by said plate and passing through registering apertures in the handle and shank portion of the head, and engaging the threaded wall of one of said apertures, as set forth.

4. Means for adjustably holding the head of a tool in different positions with relation to its handle, consisting of a handle having a recessed end, the walls of which have central registering apertures, one of which is threaded, one of said walls having apertures near the outer edge thereof, a tool-head having a cylindrically-outlined shank portion centrally apertured, and provided with a circular series of indentations in one face thereof, a plate having lugs projecting from one face adapted to be inserted through said apertures in one wall of the recessed end of the handle, and to engage said indentations, a swivel-screw carried by the plate and adapted to pass through registering apertures in the handle, and shank portion, and to engage the threads in one of said apertures, and a winged head fixed to said screw, as set forth.

5. Means for adjustably holding the head of a tool to a handle, comprising in combination with a handle with recessed ends, the walls of which have central registering apertures, one of which is threaded, one wall having marginal apertures therein, a tool-head having a shank portion adapted to enter said recess and have a partial rotary movement therein, indentations in said shank portion, a plate having lugs projecting from one face thereof, said lugs adapted to pass through apertures in one wall of the recessed end of the handle and to engage indentations in the shank portion of the head of the tool, a screw passing through said plate and adapted to be inserted through the registering apertures in the handle and shank portion of the tool, and to engage threads in one of said apertures, a head secured to one end of said screw and countersunk in the outer face of said plate, wings on said head, and a disk fixed to said screw and countersunk in the opposite face of said plate, as set forth.

6. In combination with a handle, one end of which is recessed and having walls which have central registering apertures, one of said walls having a series of marginal apertures therein, a tool-head having a shank portion adapted to be positioned in said recess, a plate, a screw swiveled thereto and adapted to pass through registering apertures in the walls of the recessed end of the handle and the shank portion of the tool-head and to form a pivotal pin therefor, lugs projecting from one face of said plate and passing through said marginal apertures in one of the walls of the recessed end of the handle and engaging indentations in the shank portion of the tool-head, a flange about a portion of the circumference of said plate, adapted to engage over a beveled end of the recessed end of the handle, as set forth.

In testimony whereof I hereunto affix my signature in presence of two witnesses.

JOSEPH FRANKLIN KEMP.

Witnesses:
A. A. GEORGE,
MARY McGARRY.